United States Patent Office 2,850,412

Patented Sept. 2, 1958

2,850,412

PROCESS FOR PRODUCING GERMANIUM-INDIUM ALLOYED JUNCTIONS

Maynard H. Dawson, Ipswich, and Egons Rasmanis, Brookline, Mass., assignors to Sylvania Electric Products Inc., Salem, Mass., a corporation of Massachusetts No Drawing. Application August 13, 1954
Serial No. 449,800

3 Claims. (Cl. 148—1.5)

This invention relates to semi-conducting crystals, and particularly to transistors utilizing such crystals.

In one type of transistor a metal contact is fused onto the crystal so that some of the metal alloys into the crystal and provides a region of altered conductivity near the junction. For example, if the crystal is of tetravalent silicon or germanium, the diffusion thereinto of a trivalent metal will produce acceptor centers, making the material of the so-called p-type, and diffusion of a pentavalent metal into the crystal will produce donor centers, making the material n-type. If the crystal is germanium and the fused metal is indium, or an indium-germanium alloy, a p-type material will be produced in the region of the contact. If the main body of the germanium was originally n-type, the result will then be a junction of the two types of material, and such a junction is useful in rectification and in transistor action.

It is desirable to fabricate such junctions in vacuum, but when that is done, the crystal is difficult to wet with the material, due to a passivating oxide film generally present on the surface, particularly if the crystal is germanium.

We have found that the wetting can be facilitated by the introduction of hydrogen at low pressure into the system at the time wetting is required. The hydrogen can afterward be removed and an evacuated or oxidizing condition restored, if desired.

We have found also that the pressure of hydrogen used is important. Wetting does not occur, for example, when the hydrogen pressure is as high as the one atmosphere heretofore used or as low as $10^{-5}$ millimeters of mercury. Pressures of about $10^{-4}$ to $10^{-3}$ millimeters of mercury are very effective, and a pressure of $5\times10^{-4}$ millimeters is especially good. This is particularly true if the wetting is to be achieved at a temperature of about 300° C. to 700° C.

The hydrogen can be introduced into the vacuum system in various ways, for example by decomposing zirconium or titanium hydride in an auxiliary furnace in the system, or by direct introduction of purified hydrogen into the system.

Other features, objects and advantages of the invention will be apparent from the following specification.

In one embodiment of the invention, a germanium crystal doped with a small percentage of antimony, for example, an amount corresponding to about $10^{14}$ atoms per cc., so that the crystal has n-type conductivity, is placed in a vacuum furnace together with a small amount of an alloy of 90% indium and 10% germanium by weight, the alloy being in the form of pellets held against opposite sides of thin germanium slices in a crucible, as described in copending application Serial No. 354,130, filed may 11, 1953, by Robert M. Wood, now Patent No. 2,756,483. The crucible is set into a quartz tube, which is then sealed and evacuated to a pressure of about $10^{-5}$ millimeters or less of mercury, and heat applied, for example, by passing electrical current through a coil around the quartz tube. The furnace is brought up to a temperature of about 300° C. and enough hydrogen admitted to the system to bring the pressure in the quartz tube up to about $5\times10^{-4}$ mm. of mercury, and the junction further heated for five or ten minutes, if desired.

The crucible containing the germanium crystals is then removed from the furnace.

Although the temperature used in the above example is 300° C., other temperatures can be used especially higher ones up to about 700° C. to 800° C. Similarly, although an alloy of 90% indium and 10% germanium has been given as an example of the material used in the pellets, other proportions can be used in the alloy, or pure indium can be used.

It is desirable to heat the indium, or the alloy, in vacuum at 700° to 800° C. for several hours, during which time gaseous impurities will be driven off, and also any elements with vapor pressures higher than that of indium.

Prio to heat treatment, it is desirable to etch the germanium slice in the manner customary in the art. After heat treatment, or prior thereto if desired, an edge of the semiconductive slice is provided with the appropriate ohmic connection to complete the assembly of the junction-type semiconductor unit.

What we claim is:

1. The method of wetting with metal a semi-conductor from the group consisting of germanium and silicon in vacuum, said method comprising the step of providing an atmosphere of hydrogen at a pressure between about $10^{-3}$ and $10^{-4}$ millimeters of mercury around the junction of said metal and said semiconductor, said metal being maintained in molten form.

2. The method of wetting germanium with indium in vacuum, said method comprising evacuating the region around the germanium and indium, introducing into the region hydrogen at a pressure of between $10^{-3}$ and $10^{-4}$ millimeters of mercury, and then heating the germanium and indium to melt the indium.

3. The method of wetting germanium with indium in vacuum, said method comprising evacuating the region around the germanium and indium, introducing hydrogen to a pressure of about $5\times10^{-4}$ millimeters of mercury, and then heating to a temperature between 300° and 700° C.

References Cited in the file of this patent

UNITED STATES PATENTS

| | | |
|---|---|---|
| 2,404,157 | Ahalt | July 16, 1946 |
| 2,597,028 | Pfann | May 20, 1952 |